United States Patent [19]

Schilte

[11] 4,056,922
[45] Nov. 8, 1977

[54] SEALING MACHINES
[76] Inventor: Hank John Schilte, 9 Burton Court, Bayswater, Victoria, Australia
[21] Appl. No.: 660,674
[22] Filed: Feb. 23, 1976
[51] Int. Cl.² .......................... B65B 51/14; B65B 7/28
[52] U.S. Cl. ....................................... 53/373; 53/300; 156/583; 219/243; 219/388
[58] Field of Search ................. 53/282, 300, 329, 373, 53/39; 156/583; 219/243, 388

[56] References Cited
U.S. PATENT DOCUMENTS

| | | | |
|---|---|---|---|
| 3,001,348 | 9/1961 | Rado | 53/373 X |
| 3,092,945 | 6/1963 | Wizelman | 53/373 |
| 3,112,590 | 12/1963 | O'Brien | 53/282 |
| 3,170,275 | 2/1965 | Rohdin et al. | 53/373 |
| 3,399,509 | 9/1968 | Greco et al. | 53/373 X |
| 3,552,093 | 1/1971 | Heiser et al. | 53/373 |
| 3,685,254 | 8/1972 | Currier et al. | 53/373 X |
| 3,783,581 | 1/1974 | Pierce | 53/282 X |
| 3,792,567 | 2/1974 | Balcome | 53/282 X |

Primary Examiner—Harrison L. Hinson
Assistant Examiner—Horace M. Culver
Attorney, Agent, or Firm—Donald D. Jeffery

[57] ABSTRACT

A sealing machine is disclosed which is useable for sealing products to a backing member, as of cardboard, by covering the products with a transparent cover and by gluing the cover to the backing. Such machine includes plate means adapted to receive and locate a cover into which is placed an article to be packed, said plate means having means to locate a backing, a loading station where the components can either manually or automatically be fed to the cover in the plate means and a sealing station having a movable pressure plate wherein the movable pressure plate is brought into contact with the backing to apply pressure to the backing and the cover while the two are sealed together. The plate means is formed with electrical contacts on the underside thereof which engage depressible electric contact means mounted on the frame at the sealing station whereby electrical heating energy can be supplied to heating element means surrounding the opening in the plate means for the cover when the pressure plate is lowered for completing the sealing operation.

7 Claims, 7 Drawing Figures

4,056,922

SEALING MACHINES

INTRODUCTION

This invention relates to improvements in sealing machines and in particular to improvements in sealing machines of the type where a product is to be held on a backing, such as of cardboard, by means of a formed member such as of transparent material adapted to overlie the article.

Such packs with transparent formed members package articles such as razor blades, torch batteries and other articles, often of this order and size.

Previously the packing of these articles has been a time consuming operation as not only do the three components of the pack, the formed member (hereinafter referred to as the cover) the article and the back have to be assembled but generally the sealing operation has had to be completed manually.

OBJECT OF THE INVENTION

An object of the invention is to provide a machine by which sealing of packaging of the articles of the general type described above can be facilitated.

STATEMENT OF THE INVENTION

The invention in one aspect provides a sealing machine including plate means adapted to receive and locate a cover into which is placed an article to be packed, said plate means having means to locate a backing, a loading station where the components can either manually or automatically be fed to the cover in the plate means and a sealing station having a movable pressure plate wherein the movable pressure plate is brought into contact with the backing to apply pressure to the backing and the cover while the two are sealed together.

Preferably the plate means may be preformed of an insulating material or have an insulating material layer thereon into which there may be formed a heating element in a position necessary to cause heat sealing, the plate means being provided with a pair of contact positions which are adapted to co-operate with contact members when the pressure plate is in engagement with the plate means whereby current passes through the heating elements of the plate means and effects heat sealing.

DESCRIPTION OF THE DRAWINGS

In order that the invention may be more readily understood a preferred embodiment will now be described with reference to the accompanying drawings wherein:

FIG. 4 is an end cross sectional view taken along line 4—4 of FIG. 3;

FIG. 5 is a top cross sectional view taken along line 5—5 of FIG. 2;

FIG. 6 is a top perspective view of a plate means;

FIG. 7 is a side cross sectional view taken along line 7—7 of FIG. 6 showing the structure of one locating means for backing material.

BRIEF DESCRIPTION OF THE PREFERRED EMBODIMENT

The machine comprises a conveyor comprising two parallel spaced apart chains. The chains carry plate means 9 which have apertures 11 therein for receiving covers of articles to be packed. The covers are either manually or automatically placed in the apertures and are then filled with an article either manually or automatically and a backing is then placed either manually or automatically over the article in the cover and all are moved to a sealing station where the conveyor is stopped and a movable pressure plate 18 is moved to press the backing against the cover and to heat seal the two together by action of heat from electrical heating elements 19. The movable pressure plate is then moved away from the plate means 9, the conveyor chains advanced and the packaged articles discharged.

DETAILED DESCRIPTION OF THE PREFERRED EMBODIMENT

Figure 1:
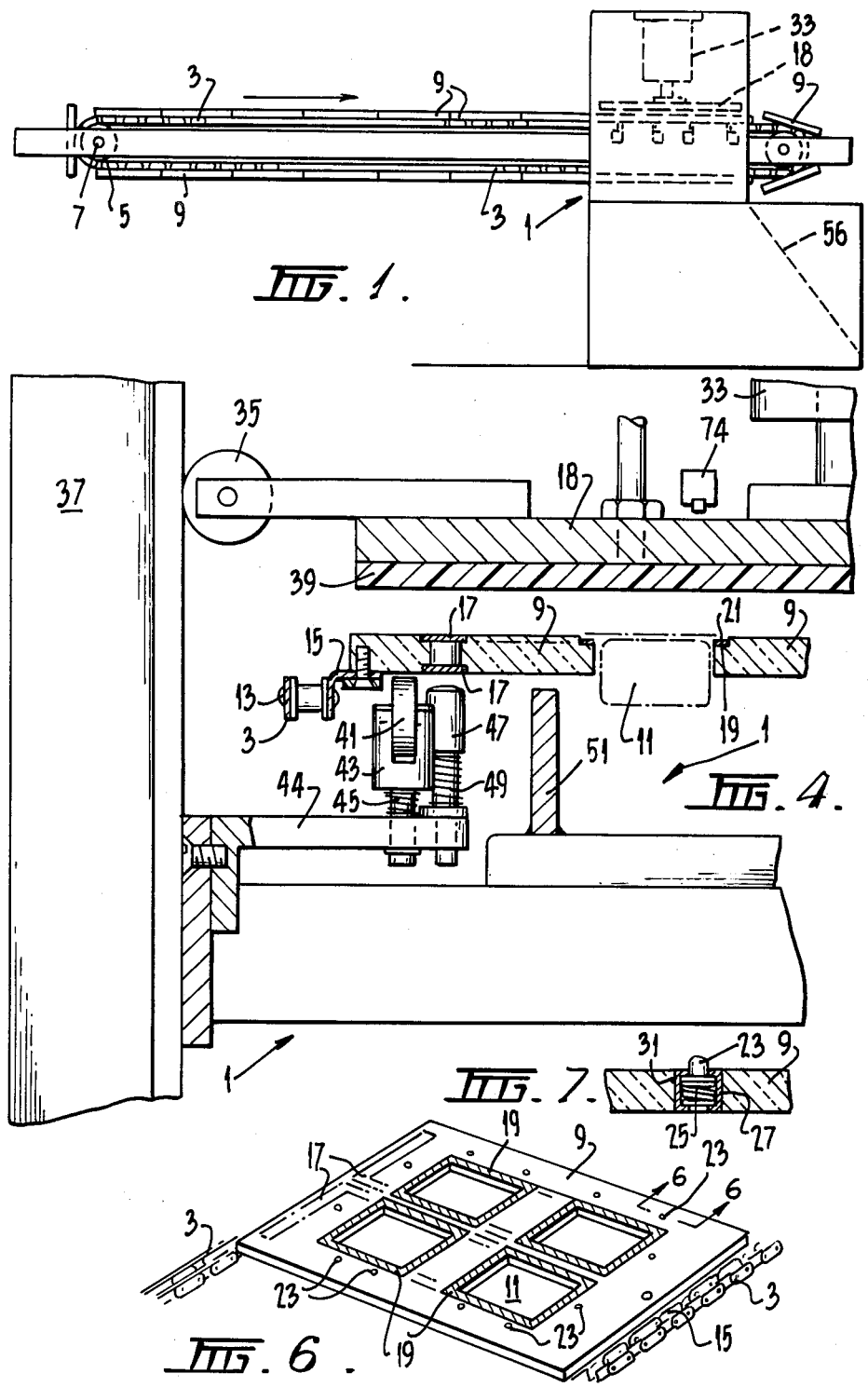
FIG. 1 is a side view of a sealing machine.
Figure 2:
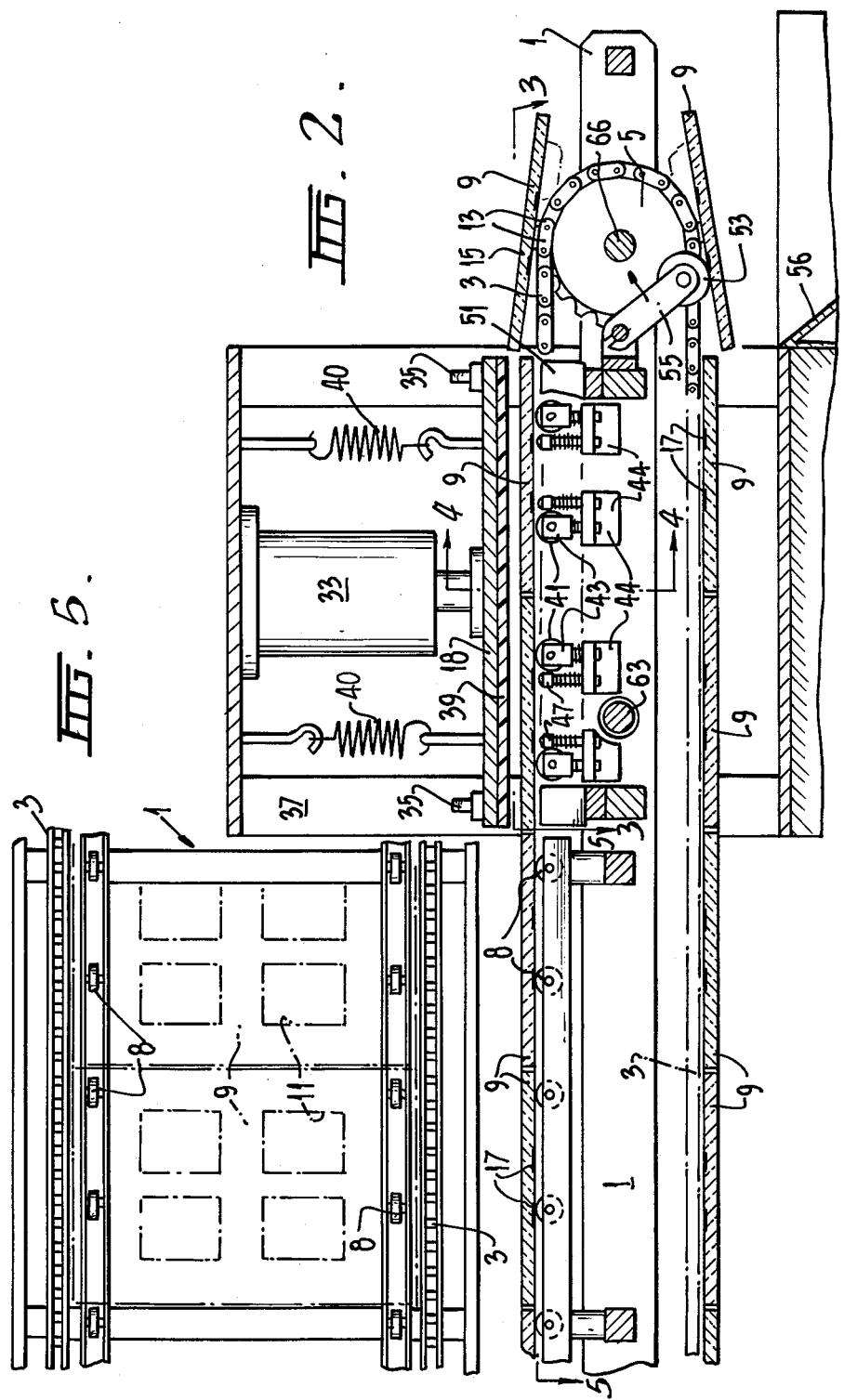
FIG. 2 is a close up side cross-sectional view of a sealing station of the machine.

The machine has a main frame shown generally as 1 which carries two parallel spaced apart endless chains 3 which pass over sprocket wheels 5. The sprockets 5 at the left hand end are fastened to a shaft 7 and shaft 7 is journalled for free rotation on the frame 1. The sprockets 5 at the other end are driven and this will be explained later. The conveyors 3 carry a number of plate means 9 which have apertures 11 therein for receiving covers of articles to be packed. The plate means 9 are of an insulating material known by the name of Bakelite and are attached to chains 3 by pins 13 which pass through the chain and a coupling bracket 15 on the plate means (see FIG. 4). Each plate means is attached to the chains 3 by the two pins 13 so that the plate means 9 can move around the sprockets 5 (see FIG. 2) and each plate means 9 is supported by a plurality of rollers 8 journalled in a sub-frame of the machine.

Each plate means 9 has electrical contact surfaces 17 embedded on the under surface thereof and on one side edge adjacent one of the conveyor chains. The contact surfaces 17 electrically communicate (by means not shown) with heating elements 19 around each aperture 11. As shown in FIG. 4 the apertures 11 have a peripheral recessed part 21 which allows a peripheral flange part of the cover to seat therein so that the uppermost surface of the flange of the cover when in the aperture 11 lies flush with the upper surface of the plate means 9 and the heating elements 19 are just under the peripheral recess.

About each of the apertures 11 are a number of locating pins 23. The pins 23 are spring biased by a spring 25 to urge each upwardly. Each spring 25 is held captive in a cup member 27 press fitted in the plate means 9. The cup member 27 contains a head 31 of the pin 23 which limits the upward travel of the pin. The pins 23 are used for correctly locating cardboard or like material backing members (not shown) with respect to the covers so that they can be heat sealed together. The purpose of the spring biasing of the pins 23 will be explained later.

Figure 3:
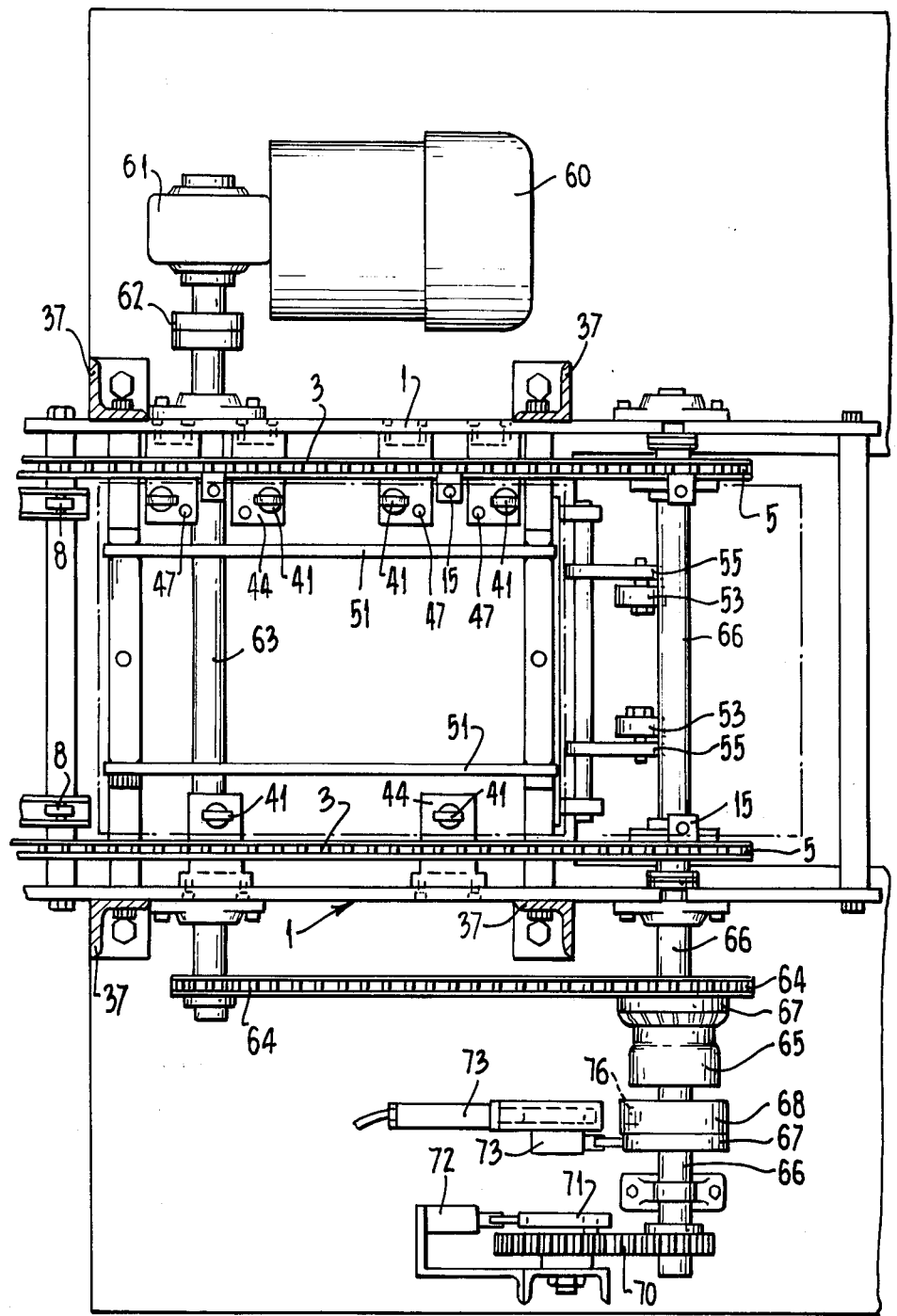
FIG. 3 is a top cross section view taken along line 3—3 of FIG. 2.

At the right hand end of the machine there is provided a sealing station which has a pressure plate 18 which is movable to simultaneously press on two plate means 9. The pressure plate 18 is moved downwardly by a ram 33 operated from a source of pressurized air and is guided by wheeled guides 35 attached thereto which locate against four upright guide posts 37. The underside of the pressure plate 18 is covered with a rubber layer 39 which ensures that a substantially even pressure is distributed over each of the apertures 11 by the pressure plate 18. Four springs 40 are provided to assist return of the pressure plate to a position where it does not contact the plate means 9. In the sealing station the conveyor plates 9 are supported by rollers 41 journalled in vertically upwardly spring biased slideable supports 43 (see FIG. 4) which are held to the frame 1 by brackets 44. Springs 45 provide the biasing of the supports 43. Upwardly spring biased electrical contacts 47 are vertically slideably provided on the side of the frame at the sealing station as the contact surfaces 17 on the plate means 9 are closest. Such contacts are arranged in pairs in two groups one pair being for making electrical connection with the contact surfaces 17 on one plate means 9 in the sealing station and the other pair being for making electrical connection with the contact surfaces 17 in the other plate means 9 in the sealing station. Springs 49 provide the bias of the contacts 47 and the bracket 44 provides support for the contacts. It will be observed by inspecting FIG. 3 that there are four rollers 41 on the contact side of the machine and two rollers 41 on the other side each contact 47 having a roller 41 in close proximity. It will also be observed from FIG. 4 that the contacts 47 have an amount of downward sliding ability almost equal to that of the supports 43.

Mounted on one side of brackets 44 on frame 1 are anvils 51 the uppermost surface of which is positioned just below the uppermost surface of the contacts 47. The uppermost surface of the rollers 41 on supports 43 is just above the uppermost surface of contacts 47. Thus when plate means 9 enter the sealing station the plate means 9 are supported by the rollers 41 and when the pressure plate 18 is moved downwardly to press on the plate means 9 the plate means 9 is moved downwardly compressing the springs 45 of the roller supports 43 until the under side of the plate means locates against the two anvils 51. The electrical contacts 47 thus make contact with the contact surfaces 17 allowing current to flow and heat the heating coils 19. The contacts 47 undergo a downward movement when the pressure plate so moved causing the springs 49 to compress and thus provide good connection with the contact surfaces 16. In the free position the upper surface of the rollers 41 is higher than the upper surface of the contacts 47 so that electrical connection is made to the plate means 9 only when the pressure plate 18 is pressing on the plate means 9.

When the plate means 9 advance out of the sealing station with the sealed packages and move over the sprockets 5 at the right hand end of the machine the packages locate against nylon rollers 53 which are journalled on arms 55 which are pivoted to the frame 1. Spring means not shown bias the roller towards the under surface of the plate means 9. The rollers 53 are positioned to apply a force to the sealed packages to force them out of the apertures 11 so that they can fall and be collected in a collection receptical. A deflection plate 56 is provided to ensure that the sealed packages deflect away from the frame 1 into the collection receptical.

Programming of operation of the starting and stopping of the conveyor and operation of ram 33 is controlled by cam means on a motor transmission of the conveyor and by electrical switches and timers. The motor 60 is drive connected through a reduction gear box 61 through a coupling 62 on shaft 63 through a chain and sprocket drive 64 through a pneumatically operated clutch 65 to the shaft 66 of the sprockets 5. The sprocket wheel 67 at the clutch 65 is able to free wheel about the shaft 66 when the clutch 65 is made non-drive transmitting. A cam 67 and a shaft locking disc 68 are fastened on the shaft 66. At the end of shaft 66 there is a gear train 70 with a two to one reduction ratio, the larger gear of which is drive connected with a cam 71. Three lever operated switches 72, 73 and 74 are provided. Switch 72 is associated with cam 71, switch 73 with cam 67, and switch 74 with the pressure plate 18 (see FIG. 4) to sense when the pressure plate has returned from pressing on the backing and the cover. Cam 67 has one peripheral indent and cam 71 because it rotates at half the speed of the shaft 66 has two peripheral indents 180° apart thus causing a programming of operations corresponding to each revolution of shaft 66. When switch 72 is operated by the indent a pneumatically operated locking pin 75 is caused to extend to locate in a recess 76 in the shaft locking disc 68 locking the shaft. Simultaneously with this operation the pneumatically operated clutch 65 is made non-drive transmitting thus the shaft 66 is locked and the conveyor held stationary. The programming of these operations is timed to be when two plate means 9 are directly under the pressure plate 18.

Substantially simultaneously with the above operations occurring cam 67 causes switch 73 to operate which in turn causes ram 33 to move to press on backing members in the plate means depressing the locating pins 23 which have been used to position the backing members. Operation of this switch also starts a variable timer operating which determines the time which pressure plate 18 presses on the backing members. Electrical connection of contacts 47 with the contact surfaces 17 is made and a second variable timer determines the time that current flows into the heating elements 19 which time is equal to or less than the time of operation of ram 33. After the time set by the timer has lapsed the pressure plate 18 is returned which in turn operates switch 74 which in turn causes the locking pin 75 to retract and the clutch 65 to be drive transmitting. Cams 67 and 71 operate their respective switches when the next two plate means 9 move under the pressure plate 18.

Compressed air for operation of the ram 33 clutch 65 and locking pin 75 is derived from a pump (not shown) connected with the motor 60.

In use loading operators stand on each side of the conveyor at the loading station and load covers into the plate means 9, articles to be packed into the covers, and backings over the covers locating the backings within the locating pins around each aperture. The loaded plate means advance into the sealing station where the packages are sealed and the packages are subsequently discharged. The empty plate means return to be loaded at the loading station.

In order that the backing be sealed to the cover, the cover or the backing or both are covered with a heat setting glue or a plastics material which fuses the two together.

I claim:

1. Plate means for use in heat sealing backings to covers to package articles therein, said plate means having at least one aperture therethrough into which a cover can be placed from a top face of said plate means, electric heating element means surrounding the periphery of said at least one aperture and electric contact means imbedded in said plate means for permitting electric heating energy to be passed to said electric heating element means, part of said electric contact means being on the bottom face of the plate means remote from the face of intended direction of insertion of a cover into said at least one aperture, locating means for locating backings over said aperture, and a single fastening means on each side of said plate means for permitting releasable attachment to a conveyor chain means.

2. Plate means as claimed in claim 1 wherein said electric contact means comprises two strips of electric contact material imbedded in said plate means at one side thereof and having a length which is greatest in a direction extending parallel with such conveyor chain means, whereby to allow electric contact to be made with electric heating energy supplying contacts of much smaller length in said direction even if precise registration of the plate means therewith is not made.

3. In a sealing machine including plate means adapted to receive and locate a cover into which is placed an article to be packed and a backing therefor, a sealing station having a movable pressure plate where the movable pressure plate can be brought into contact with said backing to apply pressure to said backing and said cover while the two are heat sealed together, said plate means having an aperture therein in which said cover can be received, an electric heating element means surrounding the periphery of said aperture, the improvement comprising said plate means having electric contacts for said electric heating element means on the face of said plate means remote from said pressure plate, depressible spring biased supporting means at the sealing station for supporting the plate means above anvil means as said plate means is moved into the sealing station, said anvil means providing a stop against which pressure can be applied by said pressure plate to enable sealing, and depressible spring biased electric contact means at the sealing station and separate from said plate means for making electrical contact with said contact means on said face of said plate means to enable supply of electrical heating energy to said heating means, said depressible supporting means being higher than said depressible contact means and said depressible contact means being higher than said anvil means whereby on operation of said pressure plate, said electric contact means is depressed onto said depressible contact means before said plate means engages said anvil means.

4. The invention as claimed in claim 3 wherein said depressible support means comprises a plurality of rollers on each side of said plate means, each roller being journalled for rolling support of the plate means as it is brought into the sealing station.

5. The invention as claimed in claim 3 wherein there are a plurality of abutting plate means and an endless conveyor to which the plurality of plate means are attached, said conveyor comprising two parallel spaced apart chains and wherein each plate means is releasably attached to the two parallel spaced apart chains by a single fastening means on each chain.

6. The invention as claimed in claim 3 wherein said pressure plate is of a size and the machine is provided with control means such that the pressure plate applies pressure simultaneously to two adjacent plate means.

7. The invention as claimed in claim 3 wherein the conveyor is driven by motor means which, in use, is continuously driven and wherein programming means are provided for stopping the drive to the conveyor when plate means are aligned under the pressure plate for causing the pressure plate to press on backings and covers in the plate means and for retracting the pressure plate and to then again drive the conveyor.

* * * * *